United States Patent
Kawanishi et al.

(10) Patent No.: US 8,801,481 B2
(45) Date of Patent: Aug. 12, 2014

(54) BOAT PROPULSION APPARATUS AND BOAT

(75) Inventors: Masaru Kawanishi, Shizuoka (JP); Shu Akuzawa, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 1111 days.

(21) Appl. No.: 12/034,683

(22) Filed: Feb. 21, 2008

(65) Prior Publication Data

US 2008/0214069 A1   Sep. 4, 2008

(30) Foreign Application Priority Data

Feb. 21, 2007  (JP) ................................. 2007-040330

(51) Int. Cl.

| | | |
|---|---|---|
| *B60W 10/04* | (2006.01) | |
| *B63H 21/00* | (2006.01) | |
| *B63J 99/00* | (2009.01) | |
| *B60R 25/10* | (2013.01) | |
| *B60W 50/00* | (2006.01) | |

(52) U.S. Cl.
  CPC ......... *B63J 99/00* (2013.01); *B60W 2050/0064* (2013.01); *B60R 2325/304* (2013.01); *B60W 2050/0083* (2013.01); *B63H 21/00* (2013.01); *B60R 25/1003* (2013.01)
  USPC .............................. 440/84; 340/5.65; 340/5.8

(58) Field of Classification Search
  CPC ...... B63H 21/21; B63H 21/213; B63H 21/22; B63H 21/265; F02B 61/045
  USPC ..................................................... 440/84–87
  See application file for complete search history.

(56) References Cited

U.S. PATENT DOCUMENTS

| | | | | |
|---|---|---|---|---|
| 5,838,227 | A | * | 11/1998 | Murray .................... 340/539.21 |
| 5,982,292 | A | | 11/1999 | Tagawa et al. |
| 6,975,936 | B2 | * | 12/2005 | Akuzawa et al. ............. 701/114 |
| 7,104,851 | B1 | * | 9/2006 | Gonring et al. .................... 440/1 |
| 7,130,739 | B2 | | 10/2006 | Ito et al. |
| 7,164,213 | B2 | * | 1/2007 | Yoshimura et al. .......... 307/10.2 |
| 2003/0093196 | A1 | | 5/2003 | Okuyama |
| 2004/0183653 | A1 | | 9/2004 | Hata et al. |
| 2004/0242091 | A1 | * | 12/2004 | Okuyama et al. ............... 440/86 |
| 2005/0099265 | A1 | * | 5/2005 | Dix et al. ...................... 340/5.72 |
| 2007/0232162 | A1 | | 10/2007 | Okuyama et al. |
| 2007/0270055 | A1 | | 11/2007 | Ito et al. |

FOREIGN PATENT DOCUMENTS

| | | |
|---|---|---|
| JP | 08-100555 A | 4/1996 |
| JP | 10-053106 A | 2/1998 |
| JP | 2005-248710 A | 9/2005 |

OTHER PUBLICATIONS

Official communication issued in counterpart European Application No. 08003196.6, mailed on Jun. 30, 2008.

* cited by examiner

*Primary Examiner* — Brian Zimmerman
*Assistant Examiner* — An T Nguyen
(74) *Attorney, Agent, or Firm* — Keating & Bennett, LLP (57) ABSTRACT

In a boat propulsion apparatus including an engine control device for controlling operation of an engine, the engine control device includes a first ID storage and a second ID storage, a first ID is stored in the first ID storage beforehand, and the engine control device is communicably connected to a controller of a remote control device over a network. A signal containing a second ID is received from the controller when the engine control device and the controller are connected to the network for the first time and is stored in the second ID storage. Thus, maintenance and management of the engine are easy, and also it is possible to prevent a mischievous operation or theft of the boat propulsion apparatus.

7 Claims, 8 Drawing Sheets

BOAT PROPULSION APPARATUS AND BOAT

BACKGROUND OF THE INVENTION

1. Field of the Invention

The present invention relates to a boat propulsion apparatus equipped with an engine control device performing operation control of an engine and also relates to a boat.

2. Description of the Related Art

Some boat propulsion apparatuses mounted on a boat store operating data of an engine, read and display the stored operating data using a service tool, make a diagnosis based on the displayed operating data, and diagnose the cause of engine trouble or check on maintenance (refer to JP-A-2004-36420).

In such a conventional boat propulsion apparatus as described above, operating data of the engine can be stored and displayed. However, there may be a case in which the boat propulsion apparatus is removed from the boat and the engine is replaced with an engine of a fuel injection type or a new function is added. Therefore, the importance of the maintenance and engine setting is increased. Accordingly, it is necessary that the maintenance and management of the engine be easy for servicing staff. In addition, measures for preventing a mischievous operation or theft of the boat propulsion apparatus.

SUMMARY OF THE INVENTION

In order to overcome the problems described above, preferred embodiments of the present invention provide a boat propulsion apparatus and a boat in which the maintenance and management of the engine are easy and also it is possible to prevent a theft or mischievous operation of the boat propulsion apparatus.

According to a preferred embodiment of the present invention, a boat propulsion apparatus includes an engine control device for controlling an engine operation and including a first ID storage and a second ID storage; a first ID is stored in the first ID storage beforehand; the engine control device is communicably connected to a controller of a remote control device over a network; and a signal containing a second ID is received from the controller when the engine control device and the controller are connected to the network for the first time and is stored in the second ID storage.

The engine control device preferably performs authentication of the second ID with the controller at a predetermined timing after the second ID is stored and enables remote control by the remote control device if the second ID is authenticated by the authentication.

A signal is preferably sent for the engine control device to display a warning on a display device if the second ID is not authenticated.

The second ID storage can be initialized by an operation of a service tool connected to the engine control device with data communication enabled.

According to another preferred embodiment of the present invention, a boat propulsion apparatus includes an engine control device performing operation control of an engine, the engine control device includes an ID storage and is communicably connected to a controller of a remote control device over a network, a signal containing an ID is received from the controller when the engine control device and the controller are connected to the network for the first time and is stored in the ID storage.

Operation control of the engine by the remote control device is preferably allowed if the engine control device receives a signal containing an ID from the controller.

According to another preferred embodiment of the present invention, a boat includes a boat propulsion apparatus according to one of the preferred embodiments of the present invention described above.

According to a preferred embodiment of the present invention, the engine control device has the first ID storage and the second ID storage, the first ID is stored in the first ID storage beforehand, the engine control device is communicably connected to the controller of the remote control device over a network, the signal containing the second ID is received from the controller when the engine control device and the controller are connected to the network for the first time and is stored in the second ID storage. Accordingly, because there are two types of authentication IDs, which are the first ID and the second ID, a completion test can be performed at a time of shipment from a production site by using the first ID, for example. Further, for example, even if overwriting of an authentication ID is not performed with the first ID at a base, by a boat builder, or by a main dealer, an operation check is possible. In addition, the second ID can be automatically obtained when the engine control device and the controller are connected to the network for the first time. Consequently, a troublesome setting of an operation for overwriting the authentication ID such as inputting an ID number and setting an ID overwriting mode is not necessary. As a result, service staff can easily perform, for example, precise work, maintenance and management of the engine, and also it is possible to prevent a mischievous operation or theft of the boat propulsion apparatus.

The authentication of the second ID is preferably performed with the controller at a predetermined timing after the second ID is stored, and remote control by the remote control device is enabled if the second ID is authenticated by the authentication. Consequently, it is possible to prevent a mischievous operation or theft of the boat propulsion apparatus with a different remote control device.

The signal is preferably sent for the engine control device to display a warning on the display device if the second ID is not authenticated. Consequently, it is possible to prevent a mischievous operation or theft of the boat propulsion apparatus with a different remote control device.

The second ID storage can be initialized by an operation of the service tool connected to the engine control device with data communication enabled. Consequently, service staff can perform an operation control of the engine by connecting a special remote control device and also can perform maintenance or setting of the engine.

The engine control device preferably is communicably connected to the controller of the remote control device over the network, the signal containing the ID is received from the controller when the engine control device and the controller are connected to the network for the first time and is stored in the ID storage. Consequently, for example, even if overwriting of an authentication ID is not performed at a base, by a boat builder, or by a main dealer, an operation check is possible. In addition, the ID can be automatically obtained when the engine control device and the controller are connected to the network for the first time. Consequently, a troublesome setting of an operation for overwriting the authentication ID such as inputting an ID number and setting an ID overwriting mode is not necessary. As a result, service staff can easily perform a precise work.

Operation control of the engine by the remote control device preferably is allowed if the engine control device receives a signal containing the ID from the controller. Consequently, it is possible to prevent a mischievous operation or theft of the boat propulsion apparatus with a different remote control device.

According to another preferred embodiment of the present invention, a boat includes a boat propulsion apparatus according to a preferred embodiment described above. Consequently, maintenance and management of the engine are easy, and also it is possible to prevent a mischievous operation or theft of the boat propulsion apparatus.

Other features, elements, processes, steps, characteristics and advantages of the present invention will become more apparent from the following detailed description of preferred embodiments of the present invention with reference to the attached drawings.

DETAILED DESCRIPTION OF THE PREFERRED EMBODIMENTS

Figure 1:
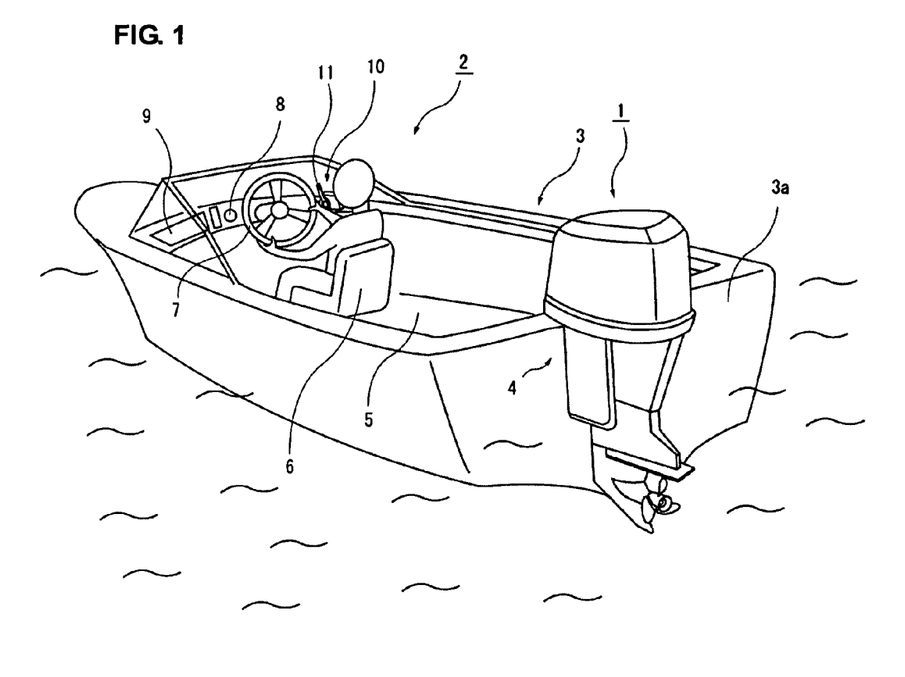
FIG. 1 shows a perspective view illustrating a boat equipped with a boat propulsion apparatus according to a preferred embodiment of the present invention as seen obliquely in the rear thereof.
Figure 2:
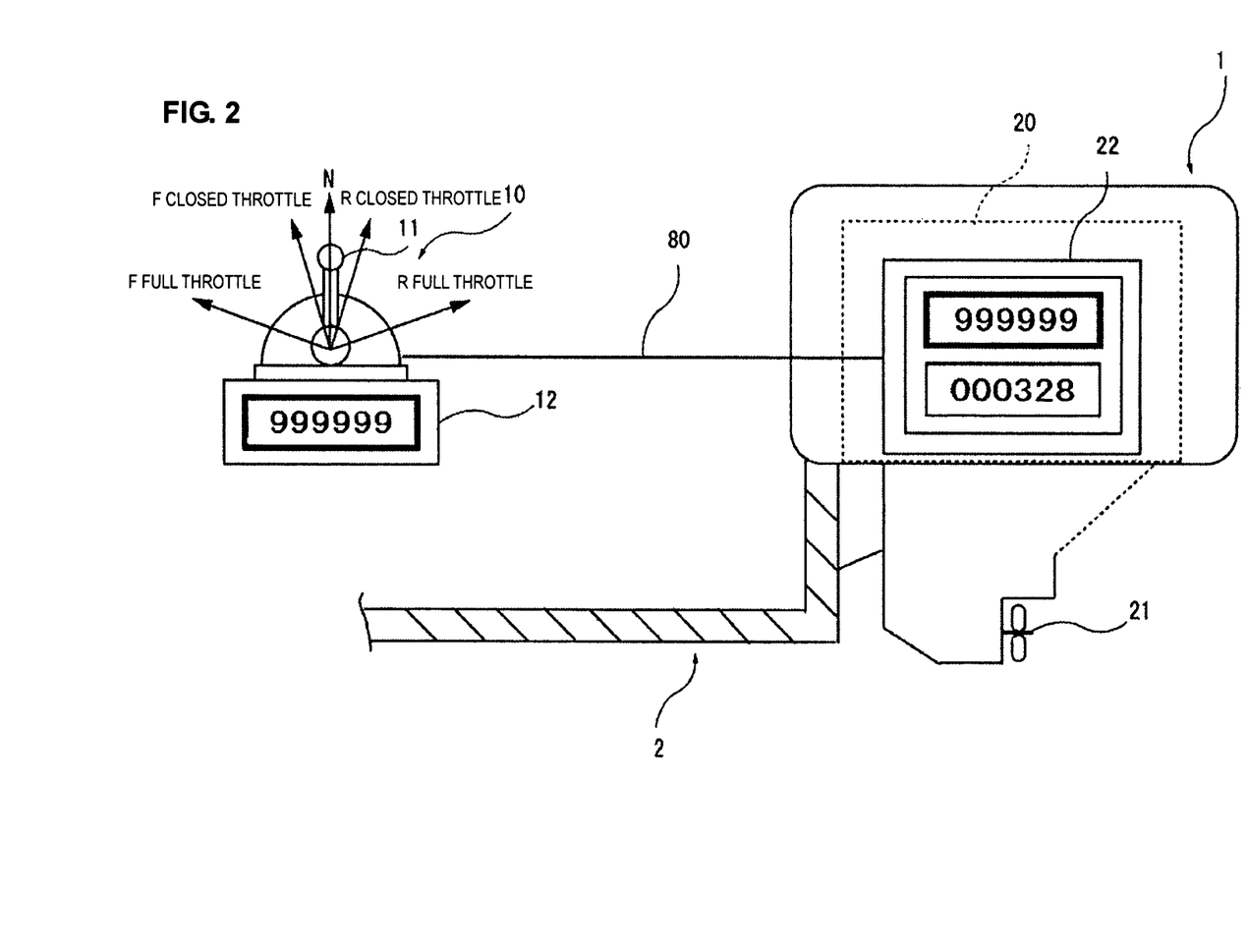
FIG. 2 shows a schematic view of a boat propulsion apparatus and a boat according to a preferred embodiment of the present invention.
Figure 3:
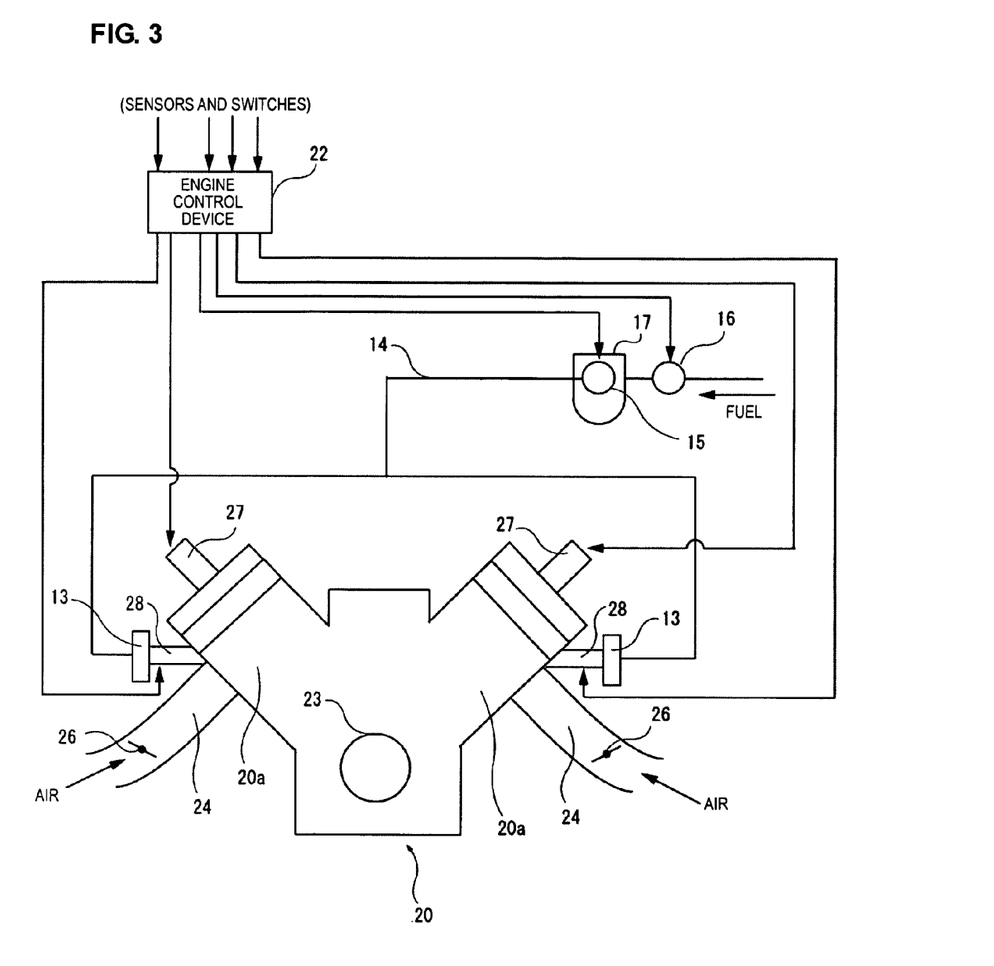
FIG. 3 shows a schematic view of an engine.
Figure 4:
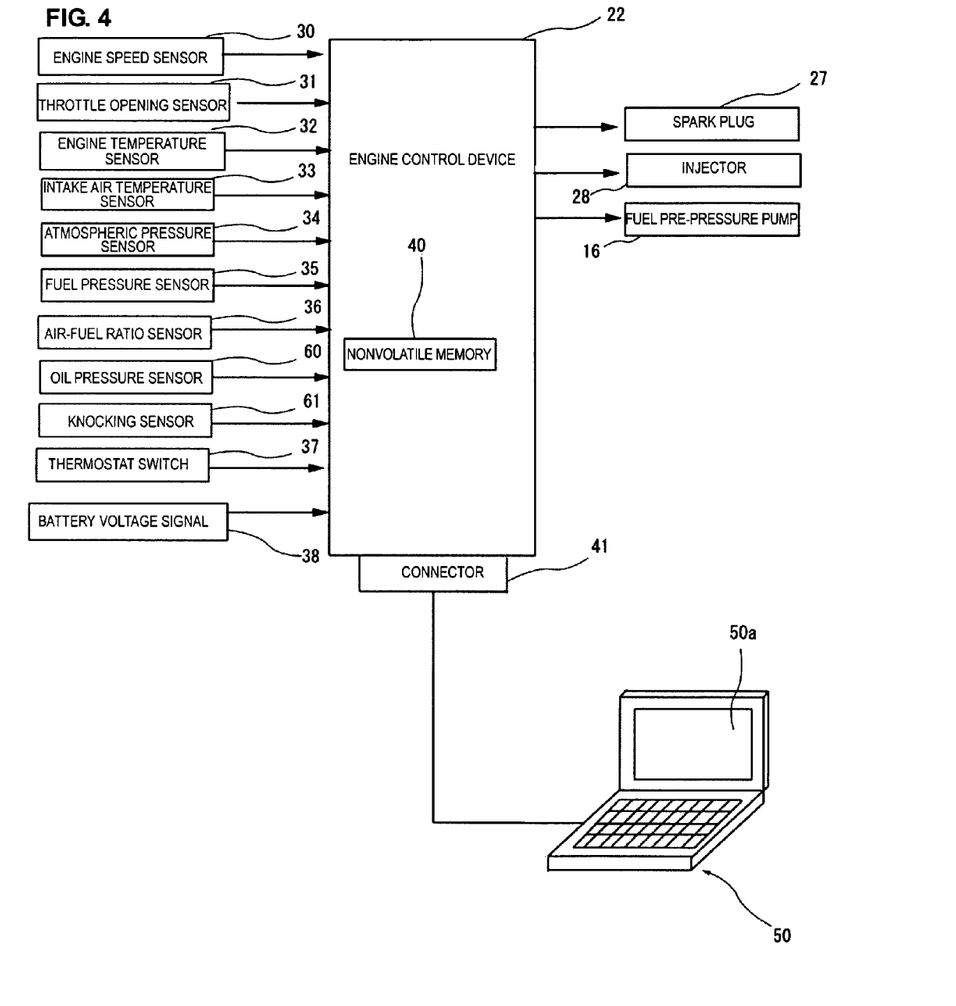
FIG. 4 is a block diagram of a control system of the engine.

Preferred embodiments of a boat propulsion apparatus and a boat according to the present invention will be described hereinafter. The present invention, however, is not limited to the preferred embodiments described herein. FIG. 1 shows a perspective view illustrating a boat equipped with a boat propulsion apparatus according to a preferred embodiment of the present invention as seen obliquely in the rear thereof. FIG. 2 shows a schematic view of a boat propulsion apparatus and a boat according to a preferred embodiment of the present invention. FIG. 3 shows a schematic view of an engine. FIG. 4 is a block diagram of a control system of the engine.

The present preferred embodiment can be applied to an outboard motor, an inboard-outboard motor and the like as a boat propulsion apparatus 1. In this preferred embodiment, an outboard motor is shown. For example, the boat propulsion apparatus 1 is mounted, via a bracket 4, on a transom 3a positioned in the rear section of a hull 3 of a boat 2. In addition, the hull 3 has a wheelhouse 5 generally in the middle section thereof, in which a steering seat 6 and a steering wheel 7 are provided. Further, a remote control device 10 is provided at a side of the steering seat 6. Remote control of a shifting device and a throttle operating device for the boat propulsion apparatus 1 is performed with an operating lever 11 of the remote control device 10. A main switch 8 of the boat 2 is provided, for example, together with a display device 9 disposed in an instrument panel or the like of the boat 2, the remote control device 10, and the like in a location that is easily accessible by an operator.

As shown in FIG. 2, in the present preferred embodiment, an engine 20 is disposed in the boat propulsion apparatus 1. The engine 20 drives a propeller 21 to rotate for the boat to travel. The remote control device 10 is provided on the boat 2. The operating lever 11 and a controller 12 are provided in the remote control device 10. The controller 12 of the remote control device 10 and an engine control device 22 for the engine 20 are communicably connected over a network 80. Remote control on the shift operating device and the throttle operating device for the boat propulsion apparatus 1 is performed via the operating lever 11.

Specifically, when the operating lever 11 is at a middle position, the shift position is in Neutral (N); when the operating lever is at a position more frontward than the middle position, the shift position is in Forward (F); and when the operating lever 11 is at a position more rearward than the middle position, the shift position is in Reverse (R). While the shift position is in Forward (F), if the operating lever 11 is pushed further forward, the throttle is gradually opened from F closed throttle to an F full throttle. While the shift position is in Reverse (R), if the operating lever 11 is pulled further rearward, the throttle is gradually opened from R closed throttle to an R full throttle. As described above, the operator can control thrust by opening or closing the throttle during a forward movement and a reverse movement.

As shown in FIG. 3, for example, a V-type six-cylinder four-cycle engine of a fuel injection type is preferably used as the engine 20 (one cylinder is shown in each of the left and the right banks in the drawing). The engine 20 has, for example, a vertical crankshaft 23 common to the cylinders 20a. An intake pipe 24 is connected to each cylinder 20a. A throttle valve 26 is provided in the intake pipe 24. A spark plug 27 and an injector 28 for fuel injection are attached to each cylinder 20a of the engine 20. The spark plug 27 is activated by the engine control device 22 via an ignition circuit (not shown) at a predetermined ignition timing according to a predetermined control program corresponding to an operating state.

Each injector 28 is connected to a fuel rail 13. Predetermined high-pressure fuel is supplied to the fuel rail 13 via a fuel piping 14. A vapor separator tank 17 and a low-pressure pump 16 are sequentially connected to the fuel piping 14. A high-pressure pump 15 is disposed in the vapor separator tank 17. The high-pressure pump 15 is driven by the crankshaft 23. The low-pressure pump 16 preferably is an electric motor type and activated by the engine control device 22 via a drive circuit (not shown). Fuel is fed from a fuel tank (not shown) to the vapor separator tank 17 via the low-pressure pump 16 and supplied by the high-pressure pump 15 in the vapor separator tank 17 to each injector 28 via the fuel rail 13.

The solenoid of the injector 28 is actuated by the engine control device 22 via a drive circuit (not shown) at a predetermined injection timing and with a predetermined injection area according to a predetermined control program corresponding to an operating state.

As shown in FIG. 4, various types of sensors and switches in relation to the operating state of the engine 20 preferably are connected to the engine control device 22. In this example, an engine speed sensor 30 for detecting the rotation of the crankshaft 23, a throttle opening sensor 31 for detecting the degree of the opening of the throttle valve 26, an engine temperature sensor 32 for detecting the temperature of the engine from the temperature of an engine wall or cooling water, an intake air temperature sensor 33 for detecting the temperature of intake air in the intake pipe 24, an atmospheric pressure sensor 34 for detecting the atmospheric pressure around the engine, a fuel pressure sensor 35 for detecting the pressure of the high-pressure fuel, an air-fuel ratio sensor 36 for detecting the air-fuel ratio of air-fuel mixture, an oil pressure sensor 60 for detecting the pressure of lubrication oil, a knocking sensor 61 for detecting abnormal combustion, a thermostat switch 37 turned on and off according to the temperature of the cooling water, a battery voltage signal 38, and the like are connected to the engine control device 22. Each detection signal, each on/off signal, and the like are input to the engine control device 22.

The engine control device 22 discriminates the operating state on the basis of these inputted data and controls activation of the spark plug 27, the injector 28, the high-pressure pump 15, and the low-pressure pump 16 according to a predetermined control program corresponding to the operating state.

Operating data inputted from the various types of the sensors and the switches are stored and memorized in an EEPROM as a writable and readable nonvolatile memory 40 included in the engine control device 22. A personal computer as a service tool 50 is connected to the engine control device 22 via a connector 41. The operating data stored in the nonvolatile memory 40 is read out by the service tool 50. Program software for failure diagnosis is incorporated in the service tool 50. The operating data is read out according to the program and displayed on a monitor screen 50a. Problems are diagnosed based on the operating data displayed as described above.

Figure 5A:
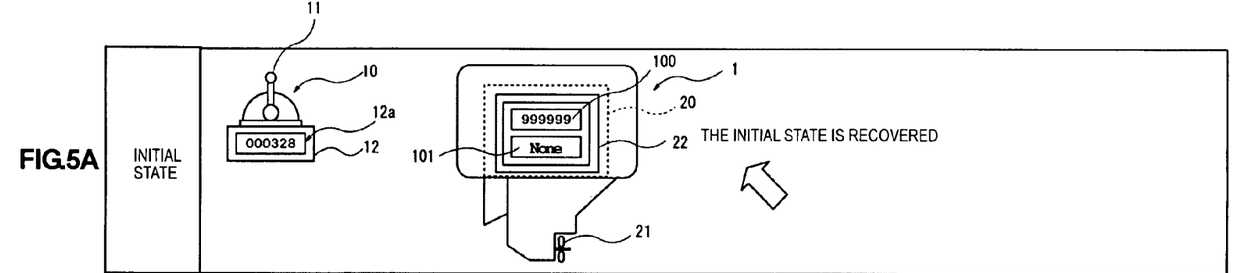
FIGS. 5A-5C illustrate an authentication ID of an engine control device of the boat propulsion apparatus.
Figure 5B:
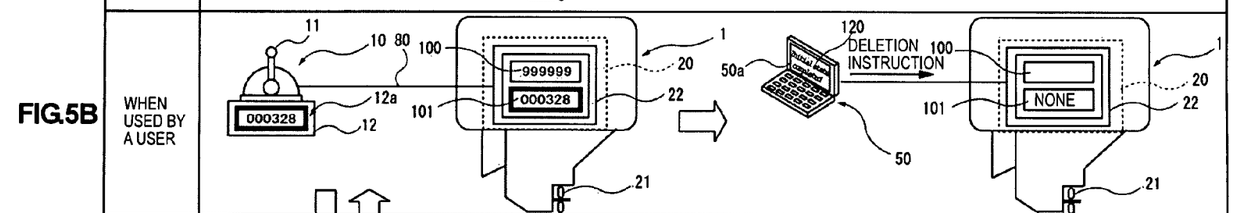
Figure 5C:
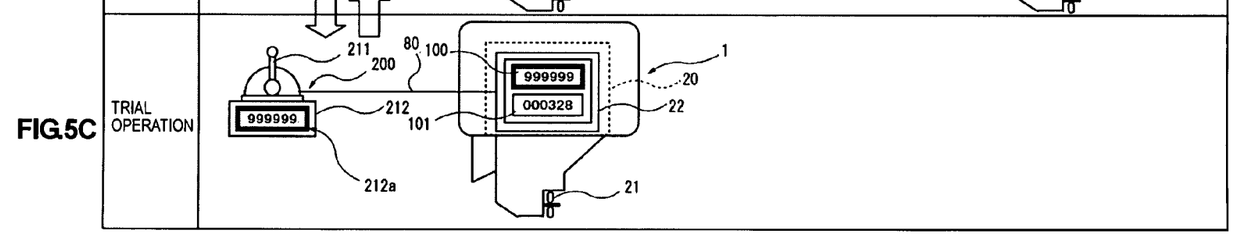

In this boat 2, as shown in FIGS. 5A-5C, the engine control device 22 has a first ID storage 100 and a second ID storage 101. A first ID is stored in the first ID storage 100 beforehand, while a second ID is not stored in the second ID storage 101. The engine control device 22 is communicably connected to the controller 12 of the remote control device 10 over the network 80. When the engine control device 22 and the controller 12 are connected to the network 80 for the first time and communication is started, a signal containing the second ID is received from the controller 12 and is stored in the second ID storage 101. There are two types of authentication IDs used between the controller 12 of the remote control device 10 and the engine control device 22 of the engine 20. The authentication IDs are a master ID as the first ID and a user ID as the second ID. FIG. 5A shows an initial state, FIG. 5B shows a state in which a user ID is in use, and FIG. 5C shows a state of a trial operation.

In the initial state shown in FIG. 5A, the controller 12 of the remote control device 10 and the engine control device 22 of the engine 20 are communicably connected over the network 80. For example, the remote control device 10 is installed in the boat 2, but the boat propulsion apparatus 1 is not mounted on the boat in a state before shipment from a production site. The user ID as the second ID is stored in a storage 12a of the controller 12 of the remote control device 10 in the initial state. Further, the first ID is stored in the first ID storage 100 of the engine control device 22 of the engine 20, but the second ID is not stored in the second ID storage 101. The first ID stored in the first ID storage 100 is the master ID and therefore cannot be deleted.

In the state in which the user ID is in use as shown in FIG. 5B, the engine control device 22 is communicably connected to the controller 12 of the remote control device 10 over the network 80. For example, the remote control device 10 is installed in the boat 2, and the boat propulsion apparatus 1 is mounted on the boat 2. When the engine control device 22 and the controller 12 are connected to the network 80 for the first time and communication is started, a signal containing the second ID is received from the controller 12 and is stored in the second ID storage 101. As the second ID for the user is stored in the second ID storage 101 of the engine control device 22, the user can use the boat propulsion apparatus 1 with the remote control device 10. Authentication of the second ID is performed with the controller 12 at a predetermined timing after the second ID is stored in the second ID storage 101. Remote control by the remote control device 10 is allowed if the second ID is authenticated by the authentication. In other words, if the second ID is not authenticated by the authentication, remote control is not allowed. Consequently, it is possible to prevent a mischievous operation or theft of the boat propulsion apparatus 1 with a different remote control device. Further, if the second ID is not authenticated, a signal is sent for the engine control device 22 to display a warning on the display device 9, and the display device 9 displays a warning or sounds a warning. Consequently, it is possible to issue warning against a mischievous operation or theft of the boat propulsion apparatus 1 with a different remote control device.

Past operating data of the engine 20 is in the nonvolatile memory 40 of the engine control device 22 of the engine 20. As service staff connects the service tool 50 to the stored operating data, which is in turn read out and displayed on the monitor screen 50a. Thus, diagnosis on the basis of the displayed operating data is made possible. In addition, service staff can operate the service tool 50 in order to output a deletion instruction signal from the service tool 50 so that the second ID for the user stored in the second ID storage 101 of the engine control device 22 of the engine 20 may be initialized and deleted. As described above, the second ID storage 101 can be initialized by an operation of the service tool 50 connected to the engine control device 22 with data communication enabled. Consequently, service staff can perform a maintenance and a setting of the engine by connecting a dedicated remote control device for operating and controlling the engine.

When the second ID for the user is initialized with the service tool 50, it is possible to read out the initialized data once again on the monitor screen 50a. After the initialized data is read out, a completion message 120 is displayed, and the state shown in FIG. 5A is recovered. When the second ID for the user is initialized, it is assumed that the second ID is initialized by an execution of initialization. Although it is not possible to confirm that the second ID is initialized, it is possible to read out the initialized data by the service tool 50. In addition, the completion message 120 is displayed after the initialized data is read out. Therefore, it is possible to know that the second ID for the user is initialized surely.

At a time of the trial operation of the boat propulsion apparatus 1 as shown in FIG. 5C, trial operation is performed with a remote control device 200 for a service inspection. Specifically, the controller 212 of an operating lever 211 and the engine control device 22 of the engine 20 are communicably connected to the remote control device 200 for a service inspection over the network. When the engine control device 22 receives a signal containing the first ID from the controller 212, operation control of the engine 20 with the remote control device 200 for a service inspection is allowed. Consequently, it is possible to prevent a mischievous operation or theft of the boat propulsion apparatus 1 with a different remote control device. For example, the first ID as the master ID stored in a storage 212a for the authentication ID of the controller 212 is received at a connection, the first ID as the master ID stored in the storage 212a is compared with the first ID as the master ID stored in the first storage 100 of the engine control device 22 automatically, and if the both first IDs are the same, then the trial operation of the boat propulsion apparatus 1 is allowed.

As described above, the engine control device 22 preferably includes the first ID storage 100 and the second ID storage 101, and the first ID is stored in the first ID storage 100 beforehand. Further, the signal containing the second ID is received from the controller 12 when the engine control device 22 and the controller 12 are connected to the network 80 for the first time and communication is started. Then, the second ID is stored in the second ID storage 101. Since there are two types of authentication IDs, which are the first ID and the second ID, a completion test can be performed at a time of shipment from a production site by using the first ID, for example. In addition, for example, even if overwriting of the authentication ID is not performed at a base, by a boat builder, or by a main dealer, an operation check with the first ID is possible. Moreover, the second ID can be automatically obtained when the engine control device 22 and the remote control device 200 for a service inspection are connected to the network 80 for the first time. Consequently, a troublesome setting of an operation for overwriting the authentication ID such as inputting an ID number and setting an ID overwriting mode is not necessary. As a result, service staff can easily perform a precise work.

Figure 6:
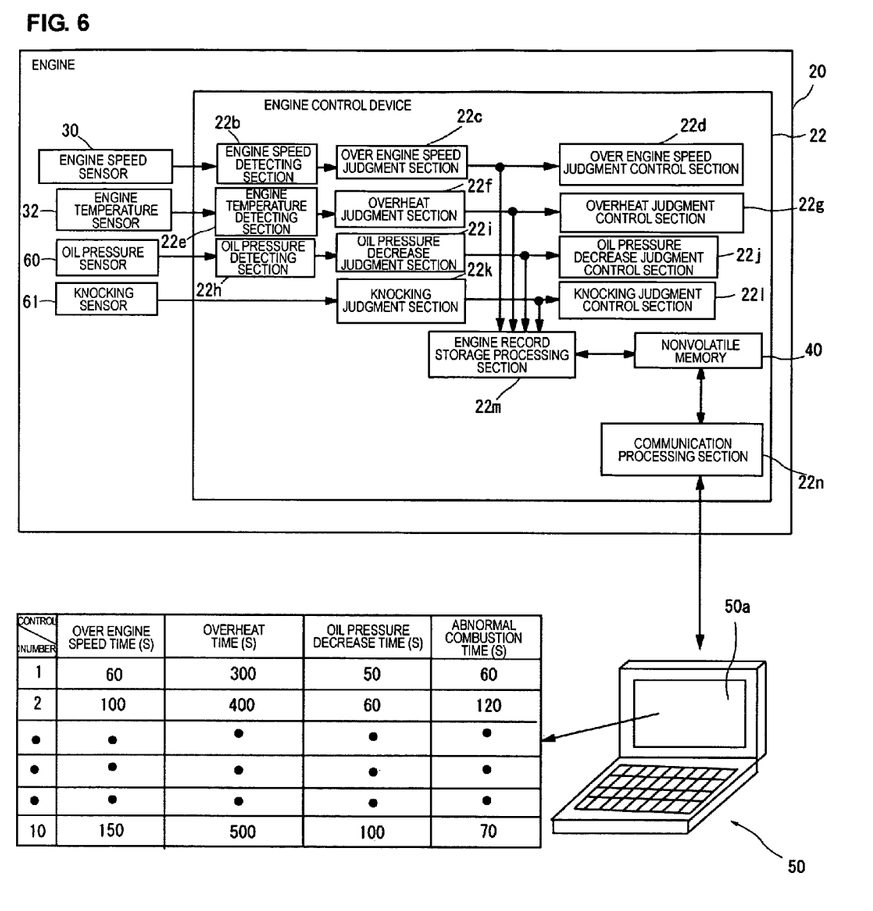
FIG. 6 illustrates the number of times of protection control on a display.
Figure 7:
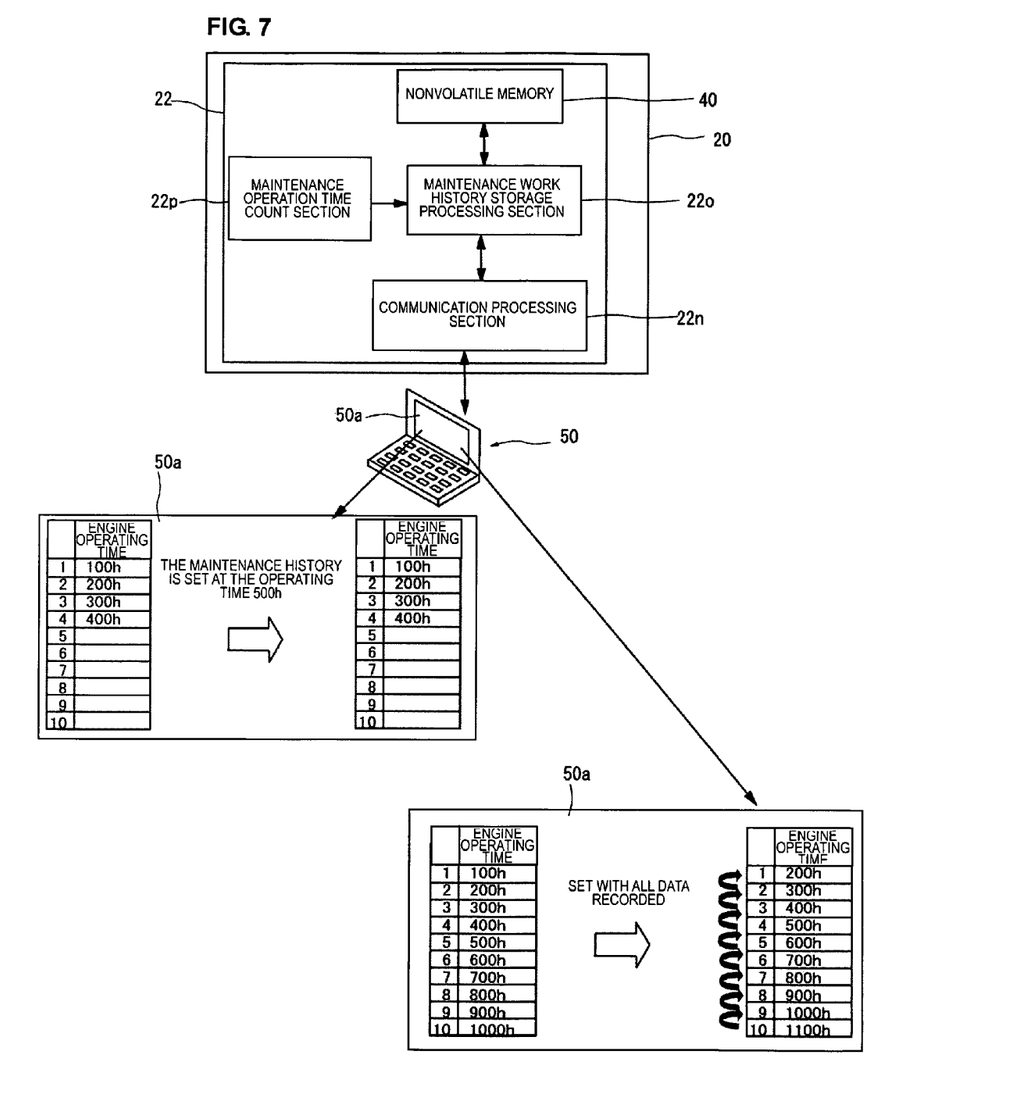
FIG. 7 illustrates a maintenance history on a display.

The service tool 50 can display the number of times of protection control and a maintenance history on the monitor screen 50a. FIG. 6 illustrates the display of the number of times of protection control and FIG. 7 illustrates the maintenance history on the display.

In FIG. 6, the engine control device 22 of the engine 20 has an engine speed detecting section 22b, an over engine speed judgment section 22c, and an over engine speed judgment control section 22d. Protection control is performed as described below. The engine speed is obtained from a pulse signal inputted from the engine speed sensor 30 in the engine speed detecting section 22b. It is judged whether or not the engine speed is equal to or more than a prescribed speed so as to cause a state of an over engine speed operation (excessive engine speed) in the over engine speed judgment section 22c. The over engine speed judgment control section 22d starts misfire control if a state of an over engine speed operation is caused. As a result, over engine speed control is performed in order to decrease the engine speed to an engine speed less than the prescribed speed.

In addition, the engine control device 22 of the engine 20 has an engine temperature detecting section 22e, an overheat judgment section 22f, and an overheat judgment control section 22g. Protection control is performed as described below. The temperature of the engine is obtained from an input voltage input from the engine temperature sensor 32 in the engine temperature detecting section 22e. It is judged whether or not the temperature of the engine is equal to or more than a predetermined temperature so as to cause a state of an overheating operation in the overheat judgment section 22f. The overheat judgment control section 22g starts misfire control if a state of an overheating operation is caused. As a result, overheat control is performed in order to decrease the engine speed to a predetermined value or lower.

Further in addition, the engine control device 22 of the engine 20 has an oil pressure detecting section 22h, an oil pressure decrease judgment section 22i, and an oil pressure decrease judgment control section 22j. Protection control is performed as described below. The oil pressure is obtained from an input voltage inputted from the oil pressure sensor 60 in the oil pressure detecting section 22h. It is judged whether or not the decrease of the oil pressure is equal to or lower than a predetermined oil pressure so as to cause a state of an operation with a low oil pressure in the oil pressure decrease judgment section 22i. The oil pressure decrease judgment control section 22j starts misfire control if a state of an operation with a low oil pressure is caused. As a result, oil pressure decrease control is performed in order to decrease the engine speed to a predetermined value or lower.

Furthermore, the engine control device 22 of the engine 20 has a knocking judgment section 22k and a knocking judgment control section 22l. Protection control is performed as described below. It is judged whether or not a state of an operation with abnormal combustion is caused on the basis of a signal inputted from the knocking sensor 61 in the knocking judgment section 22k. The knocking judgment control section 22l starts misfire control if a state of an operation with abnormal combustion is caused. As a result, abnormal combustion control is performed in order to decrease the engine speed to a predetermined value or lower.

When a condition of protection control is generated, information is sent to an engine record storage processing section 22m. Consequently, the engine record storage processing section 22m increases a count by "+1" and updates the time of occurrence every time protection control is activated. The count and the time of occurrence are stored in the nonvolatile memory 40 as a history of operation.

When service staff performs maintenance or setting of the engine 20, the service tool 50 is connected to the engine control device 22 of the engine 20, and data concerning the number of times of activation of protection control is requested from the service tool 50. A communication processing section 22n of the engine control device 22 sends the data concerning the number of times and on the time of each protection control having been activated, corresponding to the request sent from the service tool 50. The data are displayed on the monitor screen 50a of the service tool 50. A cause of abnormality, frequency of occurrences of abnormality, and the like can be taken into consideration during diagnosis of a problem. This helps to diagnose, for example, abnormality or failure in a lubricating system, a combustion system, and the like. Thus, the state of the engine can be judged appropriately.

In FIG. 7, the engine control device 22 of the engine 20 has a maintenance history storage processing section 22o and a maintenance operation time count section 22p. A maintenance history is stored as described below. When service staff performs maintenance of the engine 20, the service tool 50 is connected to the engine control device 22 of the engine 20, and an instruction requesting a maintenance time is sent from the service tool 50. The instruction is received by the communication processing section 22n of the engine control device 22, and the data concerning the maintenance time stored in the nonvolatile memory 40 is sent via the maintenance history storage processing section 22o. The data on the maintenance time is displayed on the monitor screen 50a of the service tool 50. When an engine operating time at a time of a maintenance having been stored in the nonvolatile memory 40 is, for example, 400 hrs, the maintenance history is set at "500 hrs," and an instruction for storing the maintenance time is sent.

The engine control device 22 of the engine 20 receives the instruction for storing the maintenance time from the service tool 50 by the communication processing section 22n, operates the engine for its maintenance, and counts the time set by the maintenance operation time count section 22p. Thus, "500 hrs" having been set is stored in the nonvolatile memory 40 via the maintenance history storage processing section 22o.

For example, while the nonvolatile memory 40 preferably may not have any area for storing an engine operating time at a time of a further maintenance, if the engine is operated for a maintenance and the maintenance history is set, the oldest data "100 hrs" displayed in the topmost area is deleted. Thus, the latest maintenance time is stored and displayed in the bottommost area as "1,100 hrs."

As described above, the engine operating time at a time of a maintenance done by an operation of the service tool 50 is stored in the nonvolatile memory 40 in the engine control device 22 of the engine 20. As the service tool 50 can display the engine operating time at a time of a maintenance stored in the nonvolatile memory 40, the time of maintenance can be stored and displayed. Thus, service staff can see the engine operating time of maintenance.

Further, as a plurality of numbers of accumulated engine operating time at a time of a maintenance is stored in the nonvolatile memory 40 in the engine control device 22 of the engine 20, service staff can understand a past maintenance history. Consequently, engine management is easy.

Figure 8A:
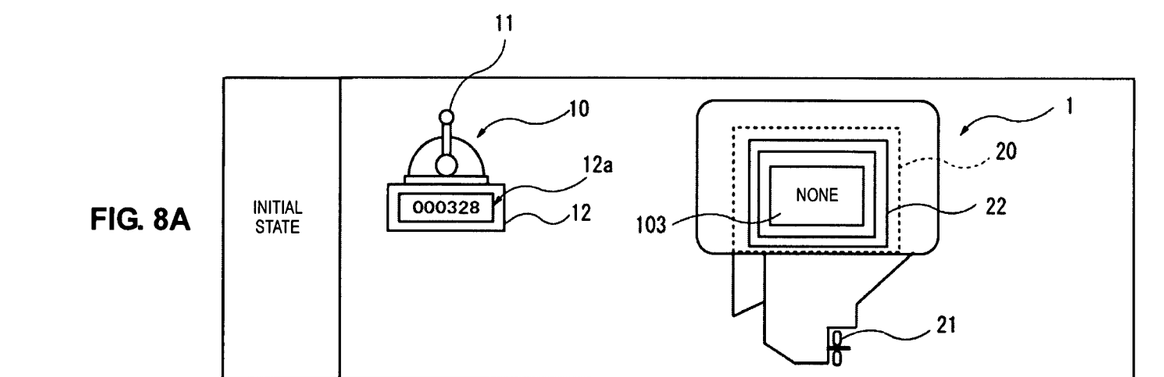
FIGS. 8A and 8B illustrate an authentication ID of another preferred embodiment of the engine control device of a boat propulsion apparatus.
Figure 8B:
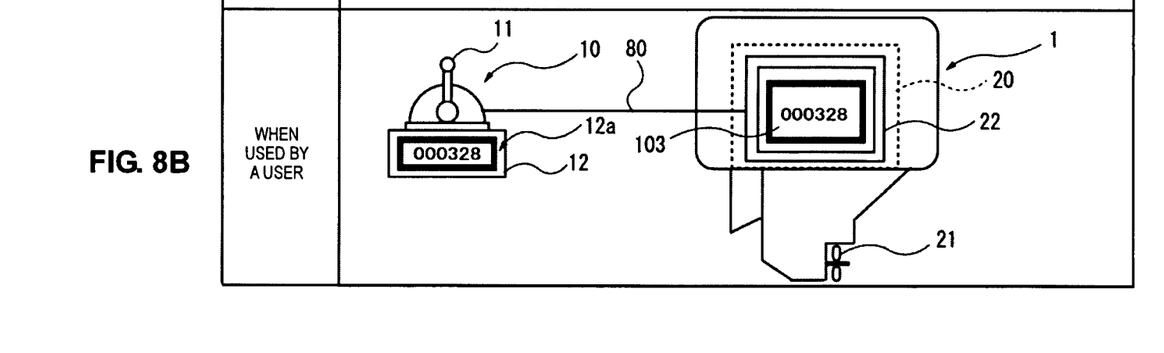

Another preferred embodiment of the boat propulsion apparatus 1 equipped with the engine control device 22 performing operation control of the engine 20 is described hereinafter with reference to FIGS. 8A and 8B. As shown in FIG. 8A, the engine control device 22 has an ID storage 103. An ID is not stored in the ID storage 103 in the initial state. As shown in FIG. 8B, when used by a user, the engine control device 22 is communicably connected to the controller 12 of the remote control device 10 over the network 80. When the engine control device 22 and the controller 12 are connected to the network 80 for the first time and communication is started, a signal containing the ID is received from the controller 12 and stored in the ID storage 103. When the engine control device 22 receives the signal containing the first ID from the controller 12, operation control of the engine 20 with the remote control device 10 is allowed.

As described above, when the engine control device 22 and the controller 12 are connected to the network 80 for the first time and communication is started, the signal containing the ID is received from the controller 12 and stored in the ID storage 103. Therefore, for example, even if overwriting of an authentication ID is not performed at a base, by a boat builder, or by a main dealer with an ID, an operation check is possible. Further, when the engine control device 22 and the controller 12 are connected to the network 80 for the first time, the ID can be obtained automatically. Consequently, a troublesome setting of an operation for overwriting the authentication ID such as inputting an ID number and setting an ID overwriting mode is not necessary. As a result, service staff can easily perform a precise work.

Furthermore, when the engine control device 22 receives the signal containing the first ID from the controller 12, operation control of the engine 20 with the remote control device 10 is allowed. As a result, it is possible to prevent a mischievous operation or theft of the boat propulsion apparatus 1 with a different remote control device 10.

The present invention can be applied to a boat propulsion apparatus equipped with an engine control device for controlling engine operation and also applied to a boat. According to various preferred embodiments of the present invention, maintenance and management of the engine are easy, and also it is possible to prevent a mischievous operation or theft of the boat propulsion apparatus.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A boat propulsion apparatus comprising:
a remote control device including a controller and an operating lever arranged to control a shift device and a throttle operating device of the boat propulsion apparatus;
an engine control device arranged to control an engine operation and including:
a first ID storage having a first ID stored therein, the first ID being a master authentication ID that enables operation of the boat propulsion apparatus when the first ID is authenticated; and
a second ID storage; wherein
the engine control device is communicably connected to the controller of the remote control device over a network;
a signal containing a second ID is received from the controller when the engine control device and the controller are connected to the network for the first time and is stored in the second ID storage;
the engine control device is arranged to perform authentication of the second ID with the controller at a predetermined timing after the second ID is stored to change a state of not allowing remote control of the shift device and the throttle operating device of the boat propulsion apparatus by the remote control device to a state enabling remote control of the shift device and the throttle operating device of the boat propulsion apparatus by the remote control device if the second ID is authenticated by the authentication;
the engine control device is arranged to allow remote control of the shift device and the throttle operating device of the boat propulsion apparatus by a master remote control device when the engine control device receives a signal containing the first ID from the master remote control device; and
the engine control device is arranged to not allow remote control of the shift device and the throttle operating device of the boat propulsion apparatus by a different remote control device when the engine control device receives a signal other than the first ID or the second ID from the different remote control device.

2. The boat propulsion apparatus according to claim 1, wherein a signal is sent for the engine control device to display a warning on a display device if the second ID is not authenticated.

3. The boat propulsion apparatus according to claim 1, wherein the second ID storage is initialized by an operation of a service tool connected to the engine control device with data communication enabled.

4. A boat equipped with the boat propulsion apparatus according to claim 1.

5. The boat propulsion apparatus according to claim 1, wherein the first ID cannot be deleted from the first ID storage.

6. The boat propulsion apparatus according to claim 1, wherein the second ID can be deleted from the second ID storage.

7. The boat propulsion apparatus according to claim 1, wherein the second ID remains in the second ID storage even when the remote control device is disconnected from the engine control device.

* * * * *